United States Patent

[11] 3,591,085

| [72] | Inventors | George E. Medawar<br>San Diego;<br>George R. Urquhart, Bonita; Leonard Holman, Imperial Beach, all of, Calif. |
|---|---|---|
| [21] | Appl. No. | 838,540 |
| [22] | Filed | July 2, 1969 |
| [45] | Patented | July 6, 1971 |
| [73] | Assignee | Rohr Corporation<br>Chula Vista, San Diego, Calif. |

[54] SOUND SUPPRESSING AND THRUST REVERSING APPARATUS
10 Claims, 4 Drawing Figs.

[52] U.S. Cl. .................................................. 239/265.13,
239/265.17, 239/265.33
[51] Int. Cl. ........................................................ B64d 33/04
[50] Field of Search .......................................... 239/265.13,
265.17, 265.33, 265.37

[56] References Cited
UNITED STATES PATENTS
2,943,444  7/1960  Baxter .......................... 239/265.33 X Primary Examiner—Lloyd L. King
Attorney—George E. Pearson ABSTRACT: Apparatus comprises shroud in streamline continuation of nacelle to surround and control exhaust gas stream from tail pipe. Includes ejector ring and reverser support ring nested with nacelle for normal flight. Rings separate axially from each other and nacelle in second, sound suppressing position. Free stream air induced through annular passages between nacelle and ejector ring and between ejector ring and support ring to surround and mix with gas stream. In third position, ejector ring moves upstream to nest with nacelle and form reverse thrust discharge passage between rings. This maximum separation between rings causes blocker doors in support ring to close and force gas stream to issue through annular discharge passage. Rings may be adjusted directly from any one position to any other position.

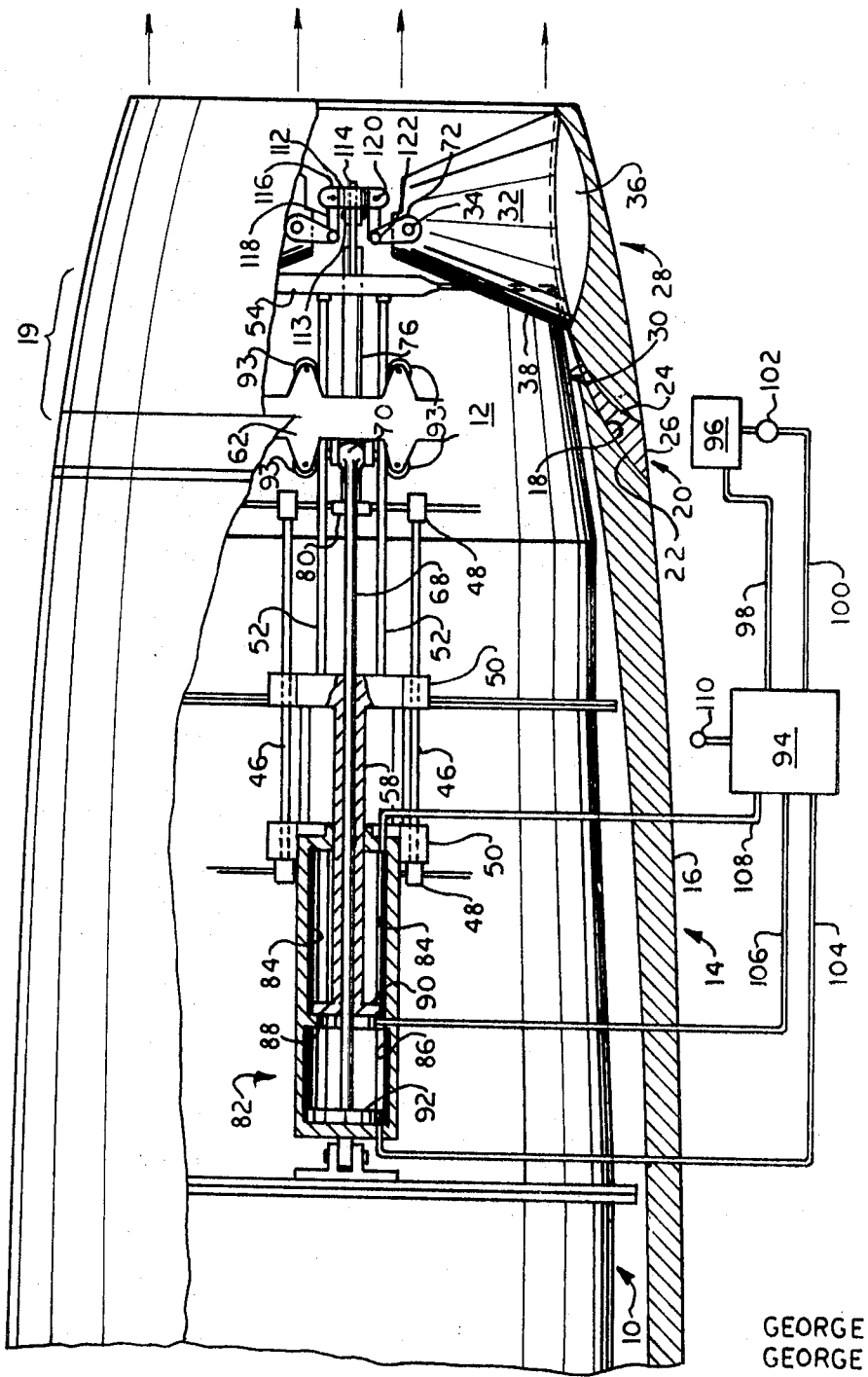

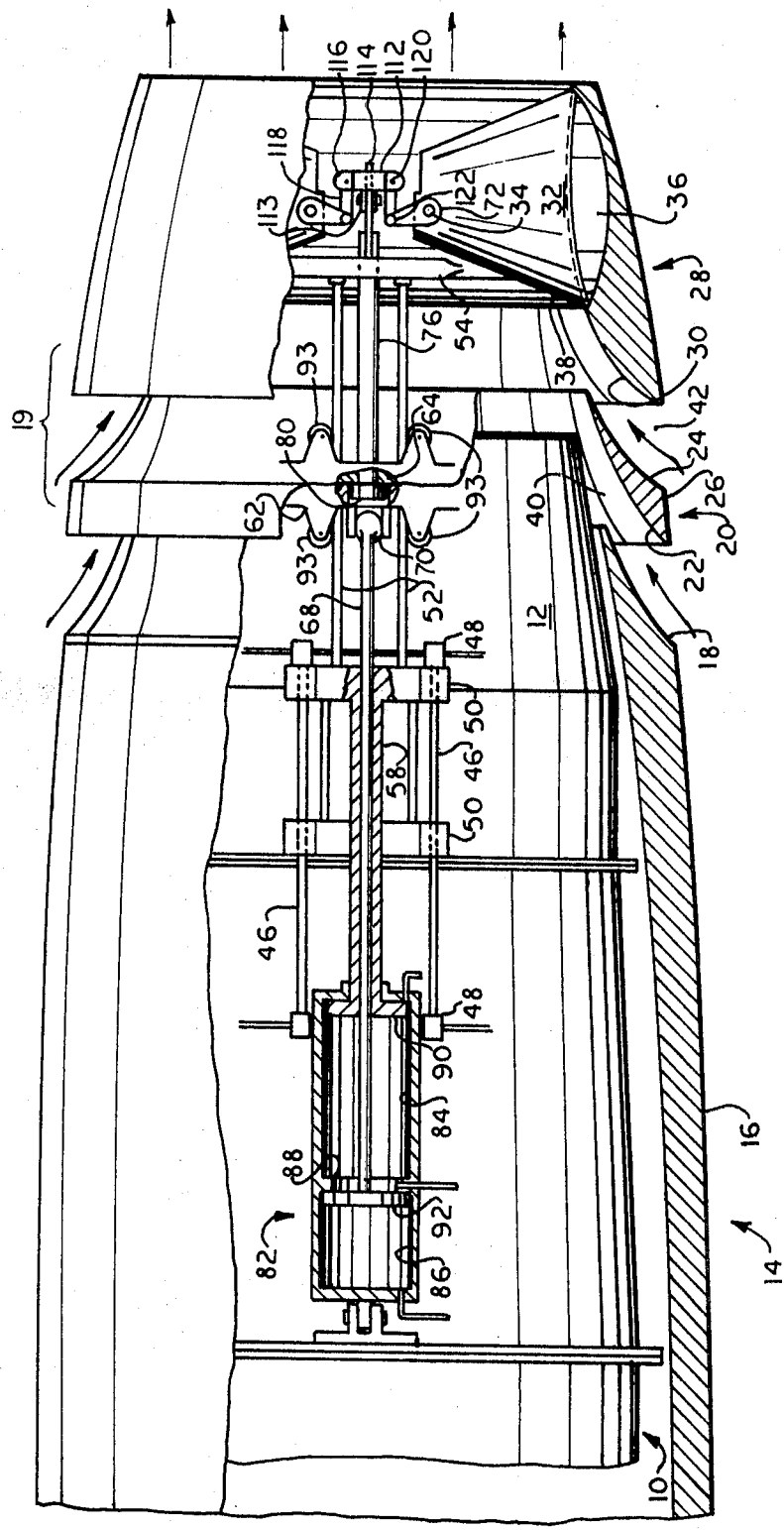

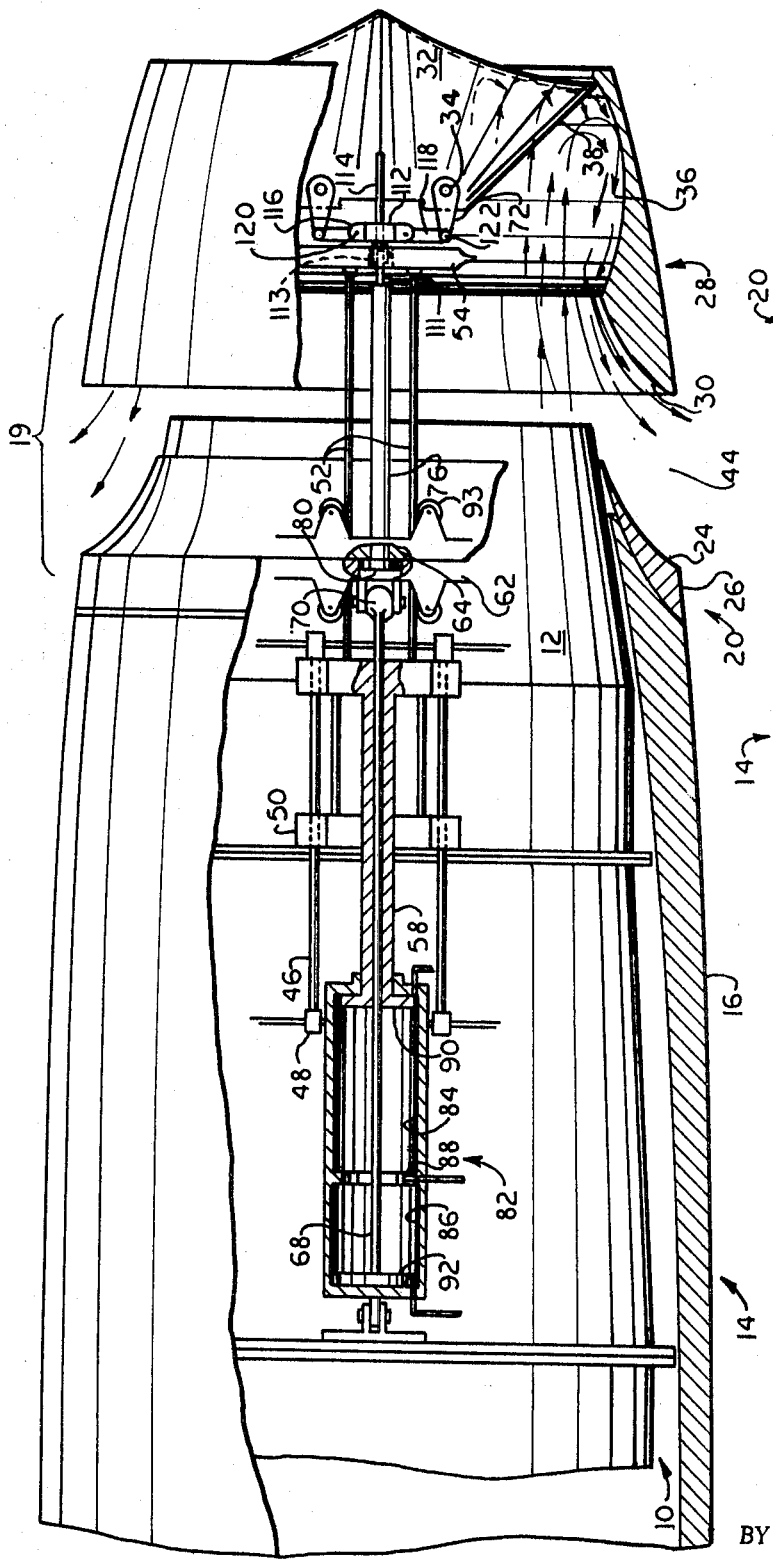

SOUND SUPPRESSING AND THRUST REVERSING APPARATUS

BACKGROUND OF THE INVENTION

This invention lies in the field of gas turbine engines, which produce reaction thrust by ejecting a high velocity stream of gas from the exhaust nozzle or tail pipe of the gas turbine. Airplanes equipped with jet engines have two problems on which a great deal of effort has been expended. One of these is that the exhaust gas stream creates a very high level of sound energy or "noise" in a wide range of frequencies and a portion of this noise reaches the ground at an energy level which is not acceptable to the public. The other problem is that jet airplanes have very high landing speeds which place an excessive burden on the wheel brakes unless some retarding means is provided to assist in deceleration.

The invention is directed to devices which reduce the sound level by mixing free stream air with the gas stream and devices which reverse the direction of exhaust gas flow to produce a counter thrust, and is more particularly directed to combined devices for performing these functions. Various schemes have been proposed and put into practice which function rather well in each of these operations and some combine both functions. Their principal drawbacks have been weight and mechanical complication resulting in high maintenance cost.

SUMMARY OF THE INVENTION

The present invention provides a very satisfactory solution to the general problem and offers a combination apparatus in which the major components cooperate in each mode but in different relation to suppress sound or noise and to produce reverse thrust. Because of the dual functions of the components there is a minimum total amount of apparatus and the actuating mechanism is relatively simple. The net result is minimum weight and maximum reliability.

Generally stated, in generic form, the apparatus comprises a shroud in general streamlined continuation of the nacelle extending rearwardly of the aft end of the tail pipe to surround and control the exhaust gas stream. The term nacelle is used generically and may be a pylon mounted body or a part of the wing or the fuselage in which the engine is buried. The shroud includes an ejector ring and a support ring which carries blocker doors. The ejector ring is generally streamlined in frustoconical form converging rearwardly and preferably has a convex upstream surface and a concave downstream surface. The aft or trailing edge of the nacelle and the leading edge of the support ring conform to the opposing surfaces of the ejector ring so that in a first position for normal operation they nest together to define a substantially imperforate conduit extending downstream of the tail pipe.

For sound suppression purposes the rings are axially separated from the nacelle and from each other to occupy a second position in which annular passages are formed fore and aft of the ejector ring to induce free stream air to flow therein and rearward around the gas stream, The mixing of the air and gas within the support ring cools the gas and reduces the sound energy in known manner.

For thrust reversal the rings take a third position in which the support ring is at its maximum aft location and the ejector ring is nested with the nacelle. There is now a single annular frustoconical passage diverging forwardly to allow the gas to be ejected laterally but with a very substantial forward component. To obtain maximum reverse thrust the confronting surfaces of the ejector ring and the support ring are so formed as to define a convergent-divergent nozzle. The maximum axial separation of the rings causes the blocker doors to close off the exit of the support ring and force the gas out through the reverse thrust passage.

BRIEF DESCRIPTION OF THE DRAWINGS

Various other advantages and features of novelty will become apparent as the description proceeds in conjunction with the accompanying drawings, in which:

FIG. 1 is a side elevational view, partly in section, of the aft portion of a nacelle with the apparatus of the invention in a first position for normal operation;

FIG. 2 is a view similar to FIG. 1, showing the apparatus in a second position for the sound suppression mode;

FIG. 3 is another view similar to FIG. 1 showing the apparatus in a third position for the thrust reversing mode; and FIG. 4 is a schematic view illustrating the general relation of the actuating mechanism to the components of the apparatus.

DESCRIPTION OF PREFERRED EMBODIMENT

The general arrangement illustrated in FIG. 1 shows the apparatus in its first or retracted position for normal operation or cruising flight. The tailpipe 10 having an aft section 12 is mounted within a nacelle 14 having an aft section 16 which may terminate in the same plane as the tailpipe but is shown as terminating slightly forward thereof. It is provided with a rear face 18 which is concave rearwardly and which also converges rearwardly.

A shroud 19 which comprises an ejector ring 20 and a support ring 28 is formed in rearward streamlined continuation of the nacelle to surround and control the gas stream discharged rearwardly from the aft section 12 of the tailpipe 10.

The ejector ring 20 is generally streamlined in frustoconical form converging rearwardly and has a convex upstream surface 22 and a concave downstream surface 24. In addition it will be noted that its maximum cross-sectional thickness at 26 is near its outer margin. When the ring is nested with the nacelle, the matching faces 18 and 22 engage to make a substantially imperforate wall.

Support ring 28 is coaxial with the nacelle and the ejector ring, and the surface of its leading edge 30 is convexly contoured to conform to the downstream surface of the ejector ring so that they will be in sealing engagement when nested, and the nacelle, ejector ring, and support ring combine to form a substantially imperforate conduit extending downstream of the tailpipe. Blocker doors 32, each arcuate in lateral cross section, are located within the support ring and each pivotally mounted thereto by means of two pivots 34 (only one pivot of each door being illustrated). The doors are convex fore and aft so that in their stowed positions they complete the streamline contour of the inner surface of the support ring. Depressions 36 are formed in the support ring to provide clearance for the leading edges 38 of the doors when they swing about pivots 34 in moving to deployed, gas stream blocking position.

To accomplish sound suppression the rings are axially separated from each other and from the nacelle in a downstream direction to the second position shown in FIG. 2. Here it will be seen that the axial spacing produces two annular inwardly converging passageways 40 and 42 to induce free stream air. Both passageways are gradually curved downstream to cause the air to meet the gas stream at a proper angle for adequate mixing without producing so much turbulence that the thrust will be adversely effected. The mixing causes cooling of the gas stream which directly reduces the sound power and it also raises the average frequencies to values which are less annoying and more easily attenuated.

When the apparatus is employed for thrust reversal, ejector ring 20 abuts nacelle 14, as shown in FIG. 3, while support ring 28 is disposed in its maximum downstream position. With the parts in this position an annular passageway 44 is formed between the two rings with about the same flow area as the two passageways 40 and 42 combined. Because of the form and relative location of surfaces 24 and 30 and the recess 36, The passageway 44 has the shape of a convergent-divergent nozzle for the ejection of exhaust gas laterally and forwardly with maximum thrust. The movement of support ring 28 as described to its maximum axial separation causes blocker doors 32 to be deployed to the position shown in FIG. 3 where they obstruct the exit path of gas through the support ring and force it to flow out through nozzle 44 to produce the desired thrust reversal. The actuation of the blocker doors will be explained in connection with the description of the actuating mechanism.

FIG. 4 illustrates one type of actuating mechanism which can be used to actuate ejector ring 20, support ring 28, and blocker doors 32, most of the components of which are identical to components of the actuating mechanism illustrated in FIGS. 1—3 and which are thus identified by the same reference numbers used to identify the latter. It should be noted here that rings 20 and 28 are supported on both sides of nacelle 14 by guide means which will be described hereinafter, but the rings and doors can be moved to different positions by means of drive components associated with the guide means on only one side of the nacelle. However, if desired, duplicate drive components can be employed and operated synchronously by suitable means. In both the mechanism illustrated in FIG. 4 and the mechanism illustrated in FIGS. 1—3, a first longitudinal guide means 46 is carried by brackets 48 shown as attached to the nacelle 14 although they may be attached to the tailpipe. A first carriage means 50 is slidably mounted on guide means 46, and a second longitudinal guide means 52 is carried by the carriage means 50 and is translatable fore and aft therewith. The support ring 28 is connected to second guide means 52 by a crossmember 54 so that axial movement of carriage means 50 produces the desired axial positioning of the support ring. In the mechanism illustrated in FIG. 4, a first servo cylinder 56, carried by the nacelle or the tailpipe, is provided with a piston, not shown, and a piston rod 58 which is connected at its aft end to carriage means 50 by pivot 60 to control the movement and position of the support ring. As will be seen hereinafter, the mechanism illustrated in FIGS. 1—3 also comprises a piston rod 58, but it is associated with a servo cylinder which differs from cylinder 56.

In both mechanisms a second carriage means 62 is movably mounted on the second guide means 52 and connected by crossmember 64 to the ejector ring. A second servo cylinder 66, (not used in the mechanism shown in FIGS. 1—3), carried by the nacelle or tailpipe, is provided with a piston, not shown, and a piston rod 68 which is connected at its aft end to carriage means 60 by pivot 70 to control the movement and position of the ejector ring. A bellcrank 72 is pivotally mounted on crossmember 54 by means of pivot 74 and is connected to the blocker doors 32 by appropriate linkage. A connector rod 76 is slidably mounted in a bearing in crossmember 64 and in the mechanism of FIG. 4 is connected at its aft end by a pivot 78 to the free end of bellcrank 72. A head or abutment 80 is formed on the forward end of rod 76. The rod is freely slidably in crossmember 64 and the parts are so dimensioned that when the rings are separated to the extent shown in FIG. 2, the head 80 just contacts member 64. When the maximum axial separation of the rings is accomplished as in FIG. 3, the rod is drawn forward by member 64 with respect to member 54 and rotates the bellcrank to swing doors 32 to their blocking position. If desired, spring means may be provided to return the doors to their stowed position when the rod is not pulling on the bellcrank.

Turning to FIGS. 1—3, it will be seen that the second actuating mechanism illustrated therein is similar to that of FIG. 4 but servo cylinders 56 and 66 are replaced by a dual cylinder system and the linkage between connector 76 and the blocker doors is more complex. The dual cylinder 82 is provided with a first bore 84 at its downstream end and a second larger bore 86 at its upstream end with a shoulder 88 at the juncture of the bores. Piston 90 is slidable in bore 84 and is connected to piston rod 58 which in turn is connected to carriage 50. It will be noted that in the second mechanism piston rod 58 is in the form of a hollow tube. Piston 92 is slidable in bore 86 and is connected to piston rod 68 which slidably extends through piston rod 58 and is connected at its aft end to crossmember 64. In the second mechanism, carriage 62 is provided with a plurality of rollers 93 which respectively engage guide means 52 and serve to prevent lateral movement of the carriage as it is moved in the fore and aft directions. As can be seen in FIG. 2, two rollers 93 are mounted inside the forward lip of ejector ring 20 on each side thereof, and two rollers are mounted outside the ejector ring on each side thereof, the latter pair of rollers being behind the aforesaid forward lip. In FIGS. 2 and 3, a portion of carriage 62 is cut away in order to show the manner in which the rod 76 abuts crossmember 64 in one configuration of the apparatus.

When the pistons are both at the upstream ends of their bores, the rings are nested with each other and with the nacelle for normal or cruising operation as shown in FIG. 1. When the pistons are moved to the downstream ends of their bores, the rings are axially separated from each other and from the nacelle to provide the configuration of FIG. 2 for the sound suppression mode. It will be noted that bore 84 is approximately twice as long as bore 86 and consequently piston 90 may move approximately twice as far as piston 92 to accomplish the desired separation. To achieve the thrust reversal configuration, piston 90 is positioned at its downstream limit and piston 92 is positioned at its upstream limit as shown in FIG. 3.

Operation of the pistons is achieved with a power supply and control device such as that shown in FIG. 1. A control valve 94 is connected to a reservoir 96 by a return conduit 98 and a supply conduit 100 including a pump 102. Conduits 104, 106, and 108 lead from the valve to the head end, shoulder, and rod end of cylinder 82 and provide either power or return flow. The valve is controlled by one or more control levers 110 movable to a plurality of positions to supply pressure fluid to any of conduits 104, 106, 108 or to open any of them to the return conduit 98.

To move the pistons from the FIG. 1 position (which is the position taken by the pistons during cruise flight when sound suppression is not required) to the FIG. 2 position (which is the position taken by the pistons during takeoff when sound suppression is required), fluid may be supplied through conduits 104 and 106 and exhausted through conduit 108. Since the pistons have different effective areas on each face, the fluid may be at the same pressure in conduits 104 and 106. To move the pistons from the FIG. 2 position back to the FIG. 1 position, conduits 104 and 106 exhaust fluid and conduit 108 supplies fluid. To move piston 90 to its downstream limit while retaining piston 92 at its upstream limit (i.e., to place the apparatus in the thrust reversing mode illustrated in FIG. 3 after it has been in the cruise flight mode illustrated in FIG. 1, which step will be effected when the aircraft is landing), fluid is supplied through conduit 106 and fluid is exhausted through conduit 108. It will be apparent that the pistons may be moved in any appropriate relation by selective operation of control handle or handles 110.

Blocking operation of doors 32 is achieved by maximum axial separation of the rings and occurs in the same way whether the change is from FIG. 1 to FIG. 3 or from FIG. 2 to FIG. 3. Connector rod 76 of FIGS. 1—3 is connected at its aft end 111 (see FIG. 3) to a third carriage 112 by means of a clevis 113 mounted on the forward end of the latter, and is slidable in crossmember 64 as stated previously with its abutment or head 80 spaced forward of crossmember 64 in the FIG. 1 position and just in contact with it in the FIG. 2 position. Doors 32 are swingably mounted on pivots 34, and when they are in stowed position their lever arms 72 extend toward each other as seen in FIGS. 1 and 2. The toggle carriage 112 is slidably mounted on two guide rods 114 (only one of which is illustrated) for limited fore and aft movement, said guide rods being mounted on crossmember 54. The carriage 112 is provided with ears 116. Links 118 are connected to the ears by pivots 120 and with the free ends of bellcranks 72 by pivots 122, and in the positions of FIGS. 1 and 2 they extend substantially fore and aft.

When carriage 112 moves toward crossmember 54, it forces links 118 forward and they in turn force the ends of bellcranks 72 outwardly. As the movement continues, links 118 extend laterally and bellcranks 72 extend forwardly just as the doors reach complete blocking position. Any jetstream force on the doors tending to move them toward stowed position is resisted by the maximum toggle effect of links 118 which are now in direct axial opposition.

As mentioned hereinbefore, in the actuating mechanism illustrated in FIGS. 1—3, the aft end 111 of connector rod 76 is pivotally connected to clevis 113 at the upstream side of carriage 112. When the rings 20 and 28 are positioned for cruise flight as illustrated in FIG. 1, pressure fluid can be supplied to the space between pistons 90 and 92 while pressure fluid is discharged from the space between piston 90 and the aft end of cylinder 82, thus forcing said piston 90 to position thereof which is illustrated in FIG. 3. This movement of piston 90 moves support ring 28 rearwardly. Being connected to carriage 112 which in turn is connected to the blocker doors mounted on the support ring by linkage, rod 76 is pulled rearwardly until its head 80 engages the front side of carriages 64. Carriage 112 then remains in fixed position and, because blocker doors 32 are linked to said carriage, further rearward movement of the support ring moves the blocker doors from the stowed position which is illustrated in FIG. 1 to the deployed position which is illustrated in FIG. 3. When ring 28 is returned to its FIG. 1 position, the doors move to stowed position, assisted by spring means if desired.

With only two major components, a dual cylinder, and very few linkage elements, it will be apparent that the apparatus of this invention accomplishes its dual purpose with a minimum of weight and mechanical complication, and is very simple to operate and maintain.

What we claim as new and useful and desire to be secured by U.S. Letters Patent is:

1. Sound suppressing and thrust reversing apparatus for use with a jet engine mounted in a nacelle, comprising: a tailpipe located at the aft end of the nacelle and adapted to receive a high velocity exhaust gas stream from the engine and discharge it rearwardly; and a shroud formed in rearward streamlined continuation of the nacelle to surround and control the gas stream; said shroud including at least one ejector ring and a support ring provided with a plurality of blocker doors; said ejector ring having an upstream surface conforming to the downstream margin of the nacelle and having a downstream surface conforming to the leading edge of the support ring; said rings being movable to a first position in nested relation with each other and with the nacelle to form a substantially imperforate conduit extending downstream of the tailpipe, a second position in which the ejector ring is spaced downstream of the nacelle and the support ring is spaced downstream of the ejector ring to induce secondary air around the exhaust gas stream, and a third position in which the ejector ring is nested with the nacelle and the support ring is spaced downstream of the ejector ring to form a reverse thrust path for the gas stream, and the blocker doors extend across the support ring to obstruct rearward flow of the exhaust gas stream therethrough.

2. Apparatus as claimed in claim 1; said ejector ring having a generally streamlined frustoconical shape converging rearwardly, its upstream surface being convex and its downstream surface concave to define a pair of annular paths for free stream air to enter and merge with the gas stream when the rings are in their second position.

3. Apparatus as claimed in claim 2; said ejector ring having its maximum cross-sectional thickness near its outer margin to combine with the leading edge of the support ring to define an annular convergent divergent nozzle for reverse thrust discharge of the exhaust gas stream when the rings are in their third position.

4. Apparatus as claimed in claim 1; actuating means to move said rings to each of said positions; and connector means operating in response to maximum axial separation of said rings to cause said doors to move to blocking position.

5. Apparatus as claimed in claim 1; actuating means to move said rings to each of said positions; and selectively operable control means for said actuating means to move said rings directly from any position to any other position.

6. Apparatus as claimed in claim 1; first longitudinal guide means carried by said nacelle; first carriage means movably mounted on said guide means; second longitudinal guide means carried by said first carriage means and extending rearwardly therefrom; said support ring being connected to the aft end of said second guide means; second carriage means movably mounted on said second guide means; said ejector ring being connected to said second carriage means; and means to move each of said carriage means in the same or opposite directions to alter the axial distance between said rings to predetermined extents.

7. Apparatus as claimed in claim 6; axially movable linkage means carried by said support ring to move said doors between retracted and blocking positions; said control means being connected to said linkage means and to said second carriage means and actuatable by the latter to move said doors to blocking position.

8. Apparatus as claimed in claim 7; said control means comprising a longitudinally extending rod connected at its aft end to said linkage means and having an abutment at its forward end adapted to be engaged by said second carriage means to pull said rod forward upon maximum axial separation of said rings and actuate said linkage means.

9. Apparatus as claimed in claim 1; a first longitudinally movable piston connected to said support ring; a second longitudinally movable piston connected to said ejector ring; and controllable pressure fluid means to move each of said pistons independently of each other.

10. Apparatus as claimed in claim 1; a longitudinally extending cylinder mounted to said nacelle and having a piston rod opening at its downstream end; said cylinder having a first bore at its downstream end and a second, larger bore at its upstream end and a shoulder at the juncture of the bores; a first piston in the first bore provided with a piston rod connected to said support ring; a longitudinal bore through said piston and rod; and a second piston in said second bore provided with a piston rod extending through the bore in said first piston and rod and connected to said ejector ring; conduits connected to the upstream and downstream ends of said cylinder and to the juncture of its bores; and manually controllable valve means connected to said conduits and adapted to supply pressure fluid selectively through said conduits to actuate said pistons selectively in the same or opposite directions.